US008009080B2

(12) United States Patent
Mizutani et al.

(10) Patent No.: US 8,009,080 B2
(45) Date of Patent: Aug. 30, 2011

(54) WEATHER RADAR AND WEATHER OBSERVATION METHOD

(75) Inventors: Fumihiko Mizutani, Kawasaki (JP); Masakazu Wada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/700,228

(22) Filed: Feb. 4, 2010

(65) Prior Publication Data

US 2010/0253574 A1     Oct. 7, 2010

(30) Foreign Application Priority Data

Apr. 2, 2009   (JP) .................................. 2009-090470
Jan. 29, 2010  (JP) .................................. 2010-017554

(51) Int. Cl.
*G01S 13/00*     (2006.01)

(52) U.S. Cl. .......... 342/26 R; 342/179; 342/83; 342/137

(58) Field of Classification Search .................... 342/26, 342/83, 137, 179
See application file for complete search history.

(56) References Cited

U.S. PATENT DOCUMENTS

| 4,951,059 | A | * | 8/1990 | Taylor, Jr. ..................... 342/155 |
| 5,281,815 | A | * | 1/1994 | Even-Tov ................. 250/339.04 |
| 6,018,307 | A | * | 1/2000 | Wakayama et al. ......... 342/26 D |
| 6,198,692 | B1 | * | 3/2001 | Sekine ............................ 367/11 |
| 7,417,578 | B1 | * | 8/2008 | Woodell et al. ............. 342/26 R |
| 2005/0203730 | A1 | | 9/2005 | Aoki et al. |
| 2005/0253748 | A1 | * | 11/2005 | Brookner ........................ 342/74 |

OTHER PUBLICATIONS

Revised Edition "Radar Technology", published by the Institute of Electronics, Information and Communication Engineers, Oct. 1996, pp. 118-137.
"Revised Radar Technique" supervised by Takashi Yoshida, Institute of Electronics, Information and Communication Engineers, Oct. 1, 1996, first edition, "Chapter 9, Meteorological Radar", 2 pages.
U.S. Appl. No. 13/013,189, filed Jan. 25, 2011, Mizutani, et al.
U.S. Appl. No. 12/821,614, filed Jun. 23, 2010, Ishizawa, et al.
U.S. Appl. No. 12/825,740, filed Jun. 29, 2010, Mizutani, et al.
U.S. Appl. No. 12/825,819, filed Jun. 29, 2010, Mizutani, et al.

* cited by examiner

*Primary Examiner* — Thomas H Tarcza
*Assistant Examiner* — Timothy A Brainard
(74) *Attorney, Agent, or Firm* — Oblon, Spivak, McClelland, Maier & Neustadt, L.L.P.

(57) ABSTRACT

A weather radar includes an antenna unit of an active phased array system in which a plurality of antenna elements configured to transmit a radar pulse and receive a reflected pulse are arranged in a vertical direction, a transmission beam formation unit configured to divide an observation range in the elevation angle direction into a plurality of observation elevation angles, subdivide each observation elevation angle into a plurality of regions, assign a set of a plurality of regions not adjacent to each other to a pulse repetition interval (PRI), and form a fan-shaped transmission beam in the elevation angle direction for each of the regions in the set, and a reception beam formation unit configured to form a plurality of pencil-shaped reception beams for each of the plurality of regions.

12 Claims, 9 Drawing Sheets

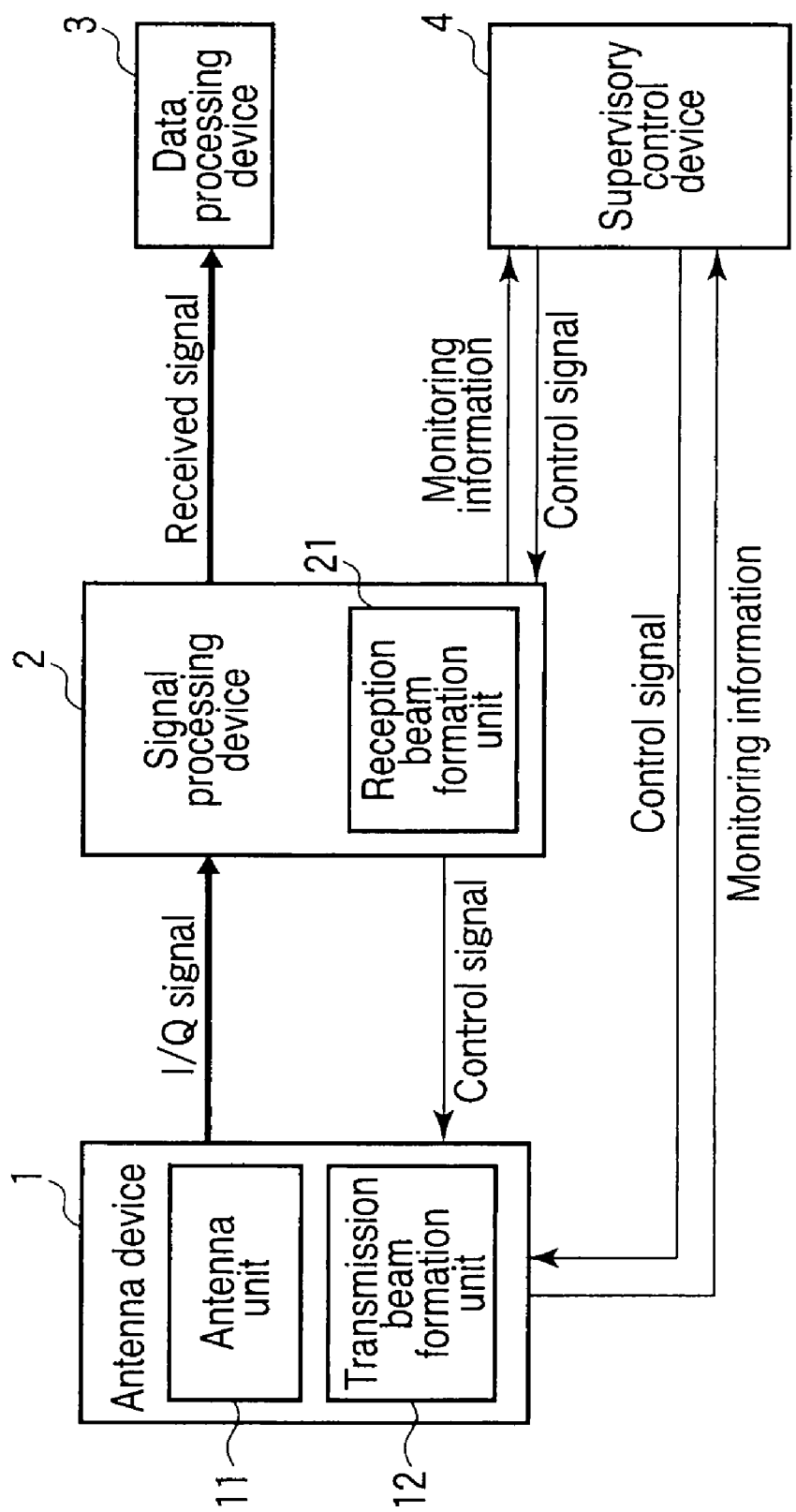
F I G. 1

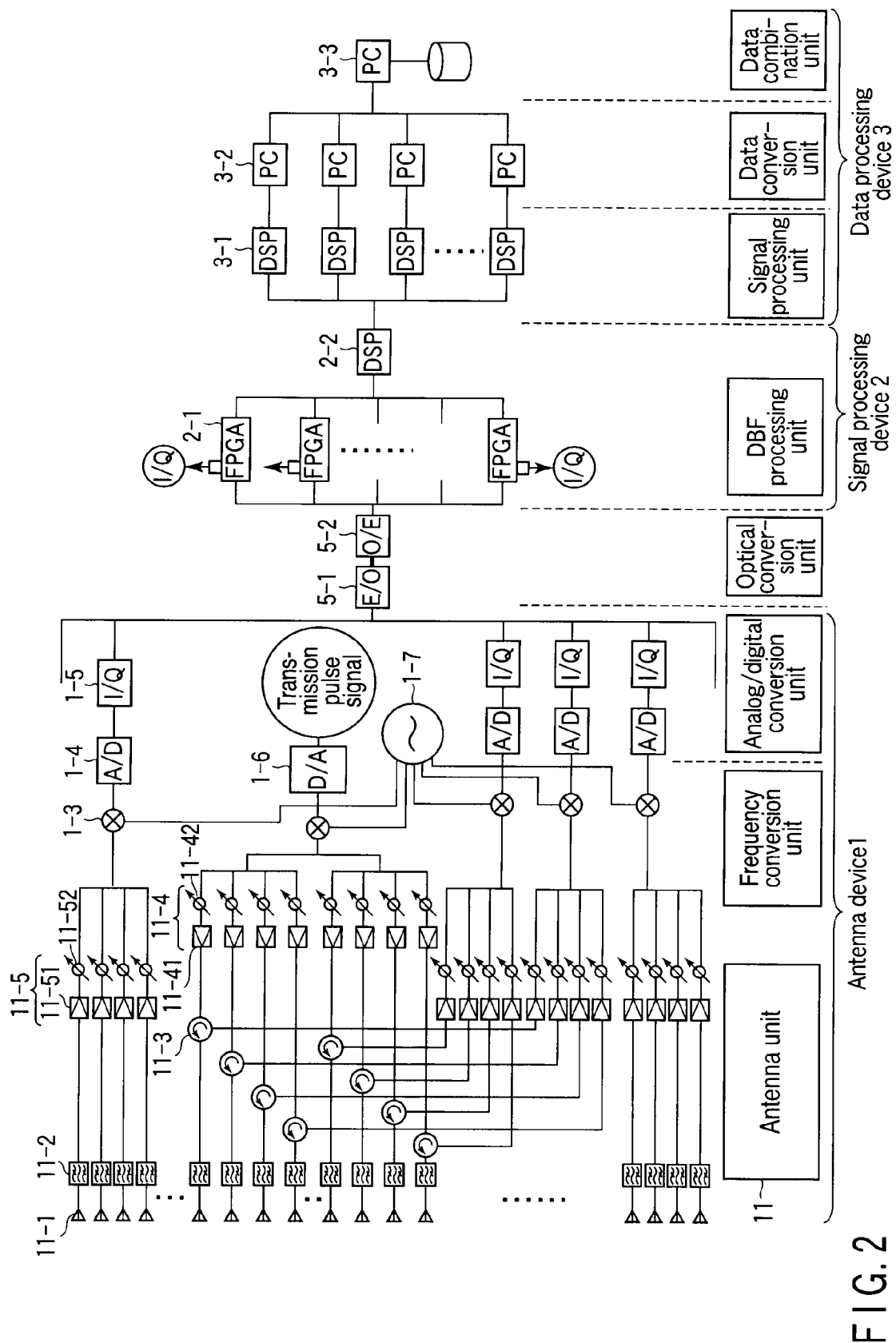
F I G. 2

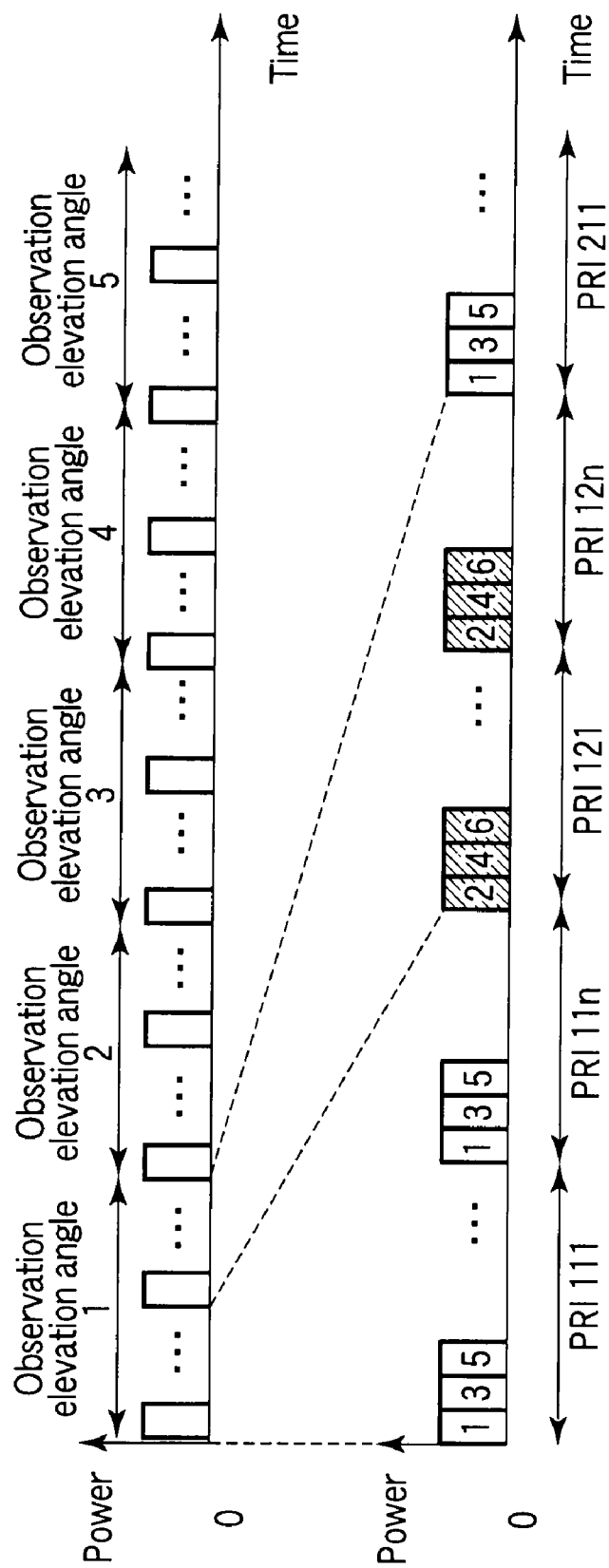
F I G. 6

WEATHER RADAR AND WEATHER OBSERVATION METHOD

CROSS-REFERENCE TO RELATED APPLICATIONS

This application is based upon and claims the benefit of priority from prior Japanese Patent Applications No. 2009-090470, filed Apr. 2, 2009; and No. 2010-017554, filed Jan. 29, 2010, the entire contents of both of which are incorporated herein by reference.

BACKGROUND OF THE INVENTION

1. Field of the Invention

The present invention relates to a weather radar, and weather observation method configured to three-dimensionally observe a weather phenomenon such as rain, cloud, and the like.

2. Description of the Related Art

In the conventional weather radar of the parabolic antenna type, a thin beam called a pencil beam is formed, the beam is rotated 360° in the horizontal direction to acquire observation data in one plane, and then the antenna elevation angle is increased stepwise to continue to acquire the next one plane data, thereby collecting three-dimensional precipitation data (see, for example, "Revised Radar Technique" supervised by Takashi Yoshida, Institute of Electronics, Information and Communication Engineers, Oct. 1, 1996, first edition, "Chapter 9, Meteorological Radar", pp. 238-240). In order to carry out this observation sequence, a time of about five to ten minutes is required, and hence temporal/spatial resolution sufficient for observation of a cumulonimbus cloud or the like changing every moment has not been obtained.

BRIEF SUMMARY OF THE INVENTION

According to an aspect of the present invention, it is provided that A weather radar includes an antenna unit of an active phased array system in which a plurality of antenna elements configured to transmit a radar pulse and receive a reflected pulse are arranged in a vertical direction; a transmission beam formation unit configured to divide an observation range in the elevation angle direction into a plurality of observation elevation angles, subdivide each observation elevation angle into a plurality of regions, assign a set of a plurality of regions not adjacent to each other to a pulse repetition interval (PRI), and form a fan-shaped transmission beam in the elevation angle direction for each of the regions in the set; and a reception beam formation unit configured to form a plurality pencil-shaped reception beams for each of the plurality of regions.

According to another aspect of the present invention, it is provided that a weather radar includes an antenna unit of an active phased array system in which a plurality of antenna elements configured to transmit a radar pulse and receive a reflected pulse are arranged in a vertical direction; a transmission beam formation unit configured to divide an observation range in the elevation angle direction into a plurality of observation elevation angles, subdivide each observation elevation angle into a plurality of regions, assign each of transmission frequencies of radar pulses different from each other to each set of regions not adjacent to each other, and form a plurality of fan-shaped transmission beams in the plurality of regions in the elevation angle direction at pulse repetition intervals (PRIs); and a reception beam formation unit configured to form a plurality pencil-shaped reception beams for each of the plurality of regions.

According to another aspect of the present invention, it is provided that a weather observation method used for a weather radar including an antenna unit of an active phased array system in which a plurality of antenna elements configured to transmit a radar pulse and receive a reflected pulse are arranged in a vertical direction includes dividing an observation range in the elevation angle direction into a plurality of observation elevation angles; subdividing each observation elevation angle into a plurality of regions; assigning a set of a plurality of regions not adjacent to each other to a pulse repetition interval (PRI); forming a fan-shaped transmission beam in the elevation angle direction for each of the regions in the set; and forming a plurality of pencil-shaped reception beams for each of the plurality of regions.

According to another aspect of the present invention, it is provided that a weather observation method used for a weather radar including an antenna unit of an active phased array system in which a plurality of antenna elements configured to transmit a radar pulse and receive a reflected pulse are arranged in a vertical direction includes dividing an observation range in the elevation angle direction into a plurality of observation elevation angles; subdividing each observation elevation angle into a plurality of regions; assigning each of transmission frequencies of radar pulses different from each other to each set of regions not adjacent to each other; forming a plurality of fan-shaped transmission beams in the plurality of regions in the elevation angle direction at pulse repetition intervals (PRIs); and forming a plurality pencil-shaped reception beams for each of the plurality of regions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a configuration example of a weather radar according to an embodiment of the present invention.

FIG. 2 is a view showing a system diagram of the weather radar of FIG. 1.

FIG. 6 is a view showing an observation sequence at the time of radar pulse transmission.

DETAILED DESCRIPTION OF THE INVENTION

Figure 3:
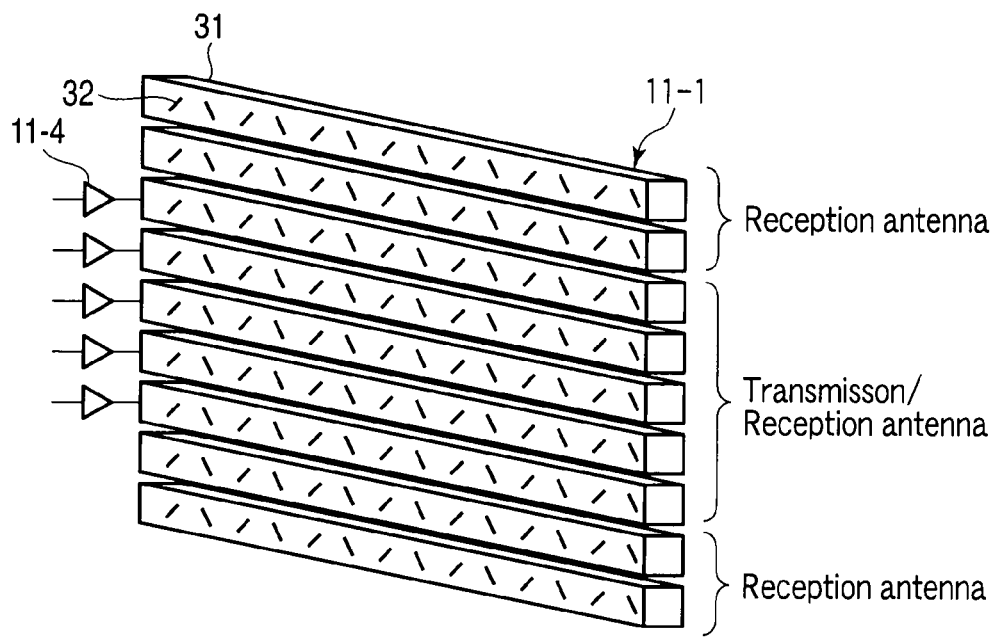
FIG. 3 is a view showing a configuration example of the antenna part of FIG. 2.

An embodiment of the present invention will be described below in detail while referring to the accompanying drawings.

FIG. 1 is a view showing a configuration example of a weather radar according to an embodiment of the present invention. This weather radar includes an antenna device 1, signal processing device 2, data processing device 3, and supervisory control device 4. The antenna device 1 includes an antenna unit 11, and transmission beam formation unit 12.

In FIG. 2, a system diagram of the weather radar is shown. The antenna unit 11 includes a plurality of antenna elements 11-1, filters 11-2, duplexers 11-3, transmission modules 11-4 and reception modules 11-5. The transmission module 11-4 includes an amplifier 11-41 and a phase shifter 11-42. The reception module 11-5 includes an amplifier 11-52 and a phase shifter 11-51. Furthermore, the antenna device 1 includes local oscillators 1-3, A/D converters 1-4, I/Q detector 1-5, a D/A converter 1-6 and a power supply 1-7. As shown in FIG. 2, the weather radar includes about one hundred antenna elements 11-1. Several tens of the antenna elements are connected to a transmission module 11-4 and a reception module 11-5 through a duplexer 11-3 respectively, and the rest of the antenna elements 11-1 are connected to the reception module 11-5 respectively. When receiving the reflected pulse, the antenna elements 11-1 are grouped into by about 4 elements at least one sub-array.

The optical conversion unit includes an E/O converter 5-1 and an O/E converter 5-2. The optical conversion unit performs E/O-O/E conversion by means of an optical rotary joint. The antenna device 1 is connected to the signal processing device 2 by the optical conversion unit. The signal processing device 2 includes a DBF processing unit including FPGAs (field-programmable gate arrays) 2-1 and a DSP (digital signal processor) 2-2. The data processing device 3 includes a signal processing unit including DSPs 3-1, a data conversion unit including PCs (personal computers) 3-2 and a data combination unit including PC 3-3.

In FIG. 3, a configuration example of the antenna unit 11 is shown. The antenna unit 11 includes a one-dimensional phased array antenna in which a plurality of antenna elements 11-1 are arranged in the vertical direction. The antenna element 11-1 includes a slot antenna. The antenna element 11-1 includes, for example, a slot waveguide 31 having a length of 2-meters, in which slots 32 are provided at intervals of half-wave lengths. By arranging about one hundred slot waveguides 31 in the vertical direction, a height of the antenna unit 11 becomes about 2 meters. By using the slot antenna to narrow a beam mechanically, it is possible to obtain sharp directivity in the azimuth angle direction, and make the beamwidth of the azimuth angle of approximately 1°.

Furthermore, several elements, which are arranged at the center of the antenna elements 11-1, have a transmission module 11-4 in addition to a reception module 11-5, and are employed as a transmission and reception antenna. To form fan-shaped transmission beams, an antenna aperture is required to be small. As it is necessary to provide a transmission power which is larger than a predetermined level, the number of transmission modules 11-4 is decided based on the electric power per antenna element 11-1.

When a radar pulse is transmitted, the antenna device 1 rotates the antenna 360° in the horizontal direction in accordance with a control signal from the supervisory control device 4, amplifies the transmission pulse signal, and sends out a radar pulse into the air. The transmission beam formation unit 12 divides the angular range in the elevation angle direction into a plurality of observation elevation angles, subdivides, within the observation period of each observation elevation angle, the observation elevation angle into a plurality of regions, assigns a set of a plurality of regions not adjacent to each other to a pulse repetition interval (PRI), and forms a fan-shaped transmission beam in the elevation angle direction for each of the plurality of regions in the set.

On the other hand, upon receiving a reflected wave from a weather object in the space by the antenna unit 11, the antenna device 1 subjects the received analog signal to A/D conversion, then subjects the digital signal to I (in-phase)/Q (quadrature) detection, and supplies the detected I/Q data to the signal processing device 2 by the optical conversion unit.

The signal processing device 2 includes a reception beam formation unit 21 configured to employ a digital beam forming (DBF) system. The reception beam formation unit 21 forms a plurality of pencil-shaped reception beams in the elevation angle direction. The signal processing device 2 calculates a received power and a Doppler velocity from the I/Q data supplied from the antenna device 1. Further, the signal processing device 2 transmits a phase control signal used to determine the transmission angle of the radar pulse to the antenna device 1 in accordance with a control signal from the supervisory control device 4.

The data processing device 3 calculates a precipitation intensity and corrects the Doppler velocity based on the received power and Doppler velocity data calculated by the signal processing device 2.

Besides transmitting a control signal to each device on the basis of an observation sequence to be described later, the supervisory control device 4 collectively manages monitoring information on each device.

Next, an observation sequence of three-dimensional weather data to be executed by the weather radar configured as described above will be described.

(Radar Pulse Transmission Operation)

Figure 4:
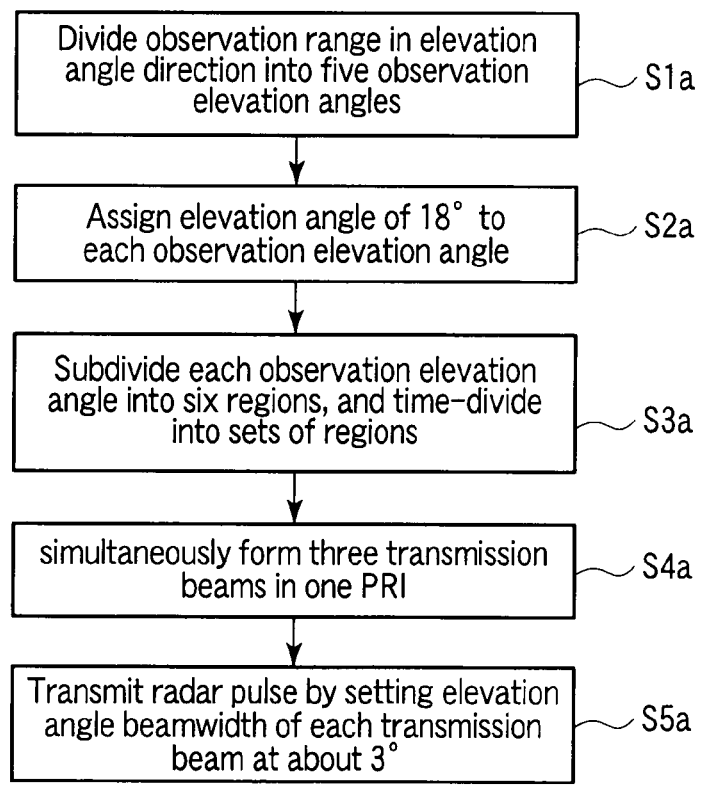
FIG. 4 is a flowchart showing a radar pulse transmission operation.

FIG. 4 is a flowchart showing a radar pulse transmission operation.

Figure 5:
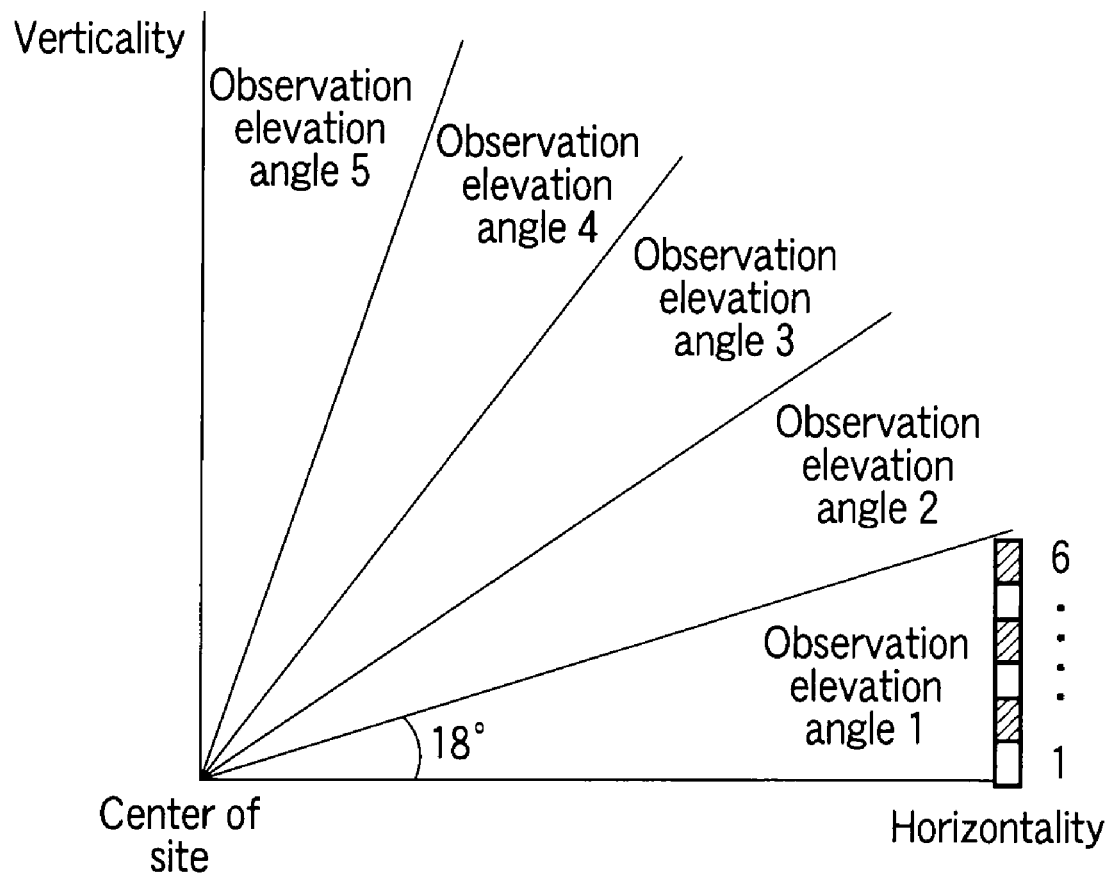
FIG. 5 is a view showing an assignment example of the observation elevation angle.

The transmission beam formation unit 12 divides an observation range in the elevation angle direction into a plurality of observation elevation angles in accordance with a control signal from the supervisory control device 4 (step S1a). FIG. 5 shows an example in which the observation range (0 to 90°) in the elevation angle direction is divided into five observation elevation angles. An elevation angle of 18° is assigned to each of the observation elevation angles 1 to 5 (step S2a). In FIG. 5, the observation elevation angles 1 to 5 are assigned to 0 to 18°, 18 to 36°, 36 to 54°, 54 to 72°, and 72 to 90° respectively. Further, the transmission beam formation unit 12 subdivides each observation elevation angle into a plurality of regions, assigns a set of a plurality of regions not adjacent to each other to a pulse repetition interval (PRI) (step S3a). For example, Each observation elevation angle is subdivided into six regions, and is time-divided alternately into a set of regions 1, 3, and 5 and set of regions 2, 4, and 6.

FIG. 6 shows an example of an observation sequence at the time of radar pulse transmission, in which the observation elevation angle is time-divided alternately into the set of regions 1, 3, and 5 corresponding to PRI 111 to PRI 11n and the set of regions 2, 4, and 6 corresponding to PRI 121 to PRI 12n. Further, the transmission beam formation unit 12 simultaneously forms three transmission beams in the elevation angle direction for each of the regions in the set in one PRI (step S4a), and transmits a radar pulse by setting an elevation angle beamwidth of each transmission beam at about 3° (step S5a).

Figure 7:
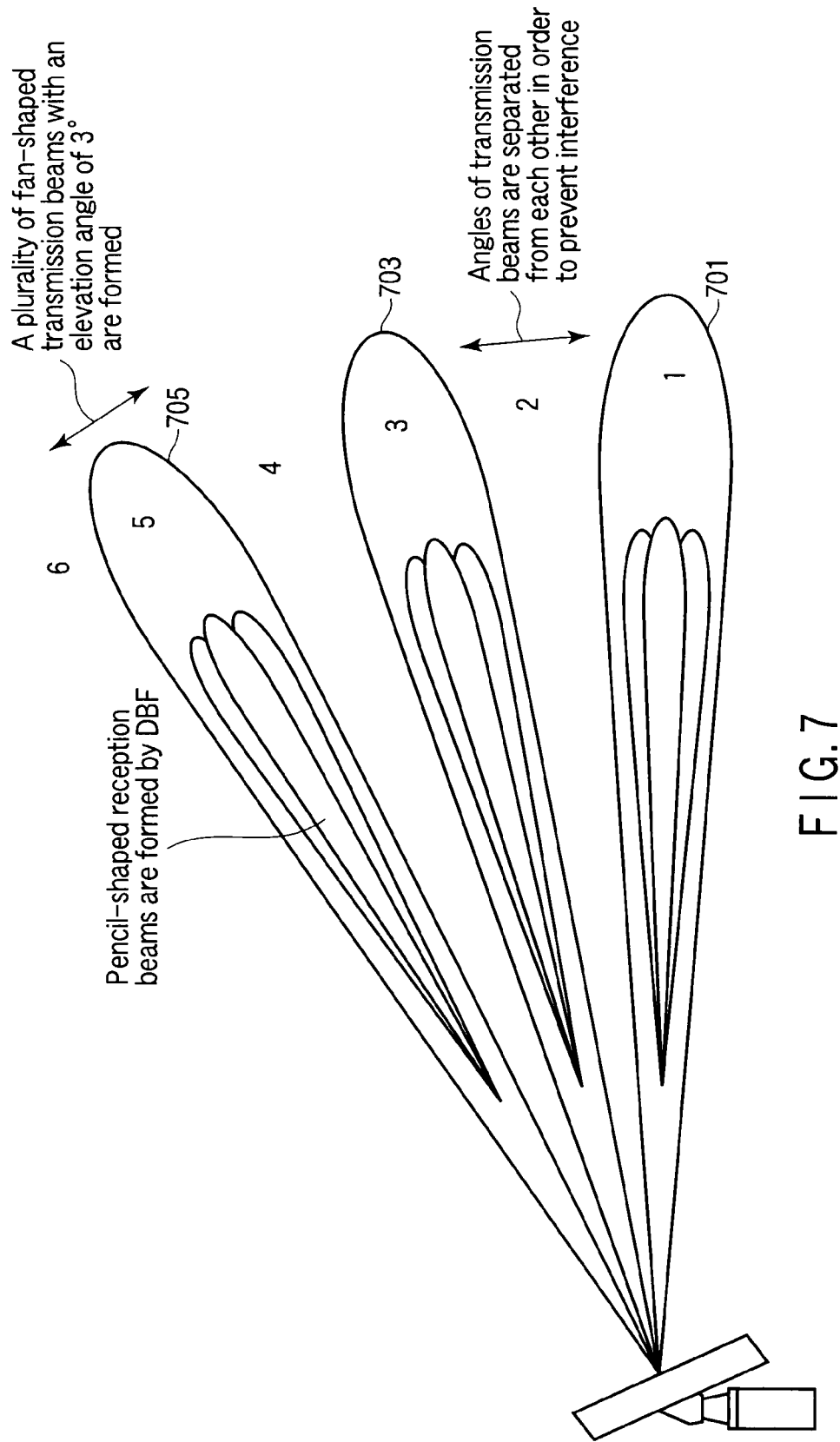
FIG. 7 is a schematic view showing an example of a transmission/reception beam.

In FIG. 7, an example of a transmission/reception beam is schematically shown. Fan-shaped transmission beams 701, 703, and 705 are formed corresponding to the regions 1, 3, and 5 with an elevation angle beamwidth of approximately 3°. At the time of radar pulse transmission, by alternately forming a set of the transmission beams 701, 703, and 705 and a set of transmission beams corresponding to the regions 2, 4, and 6, the observation elevation angle of 18° is covered.

As shown in FIG. 7, because the transmission beams 701, 703, and 705 are formed corresponding to the set of the regions not adjacent to each other, the occurrence of interference can be prevented.

(Reflected Pulse Reception Operation)

Figure 8:
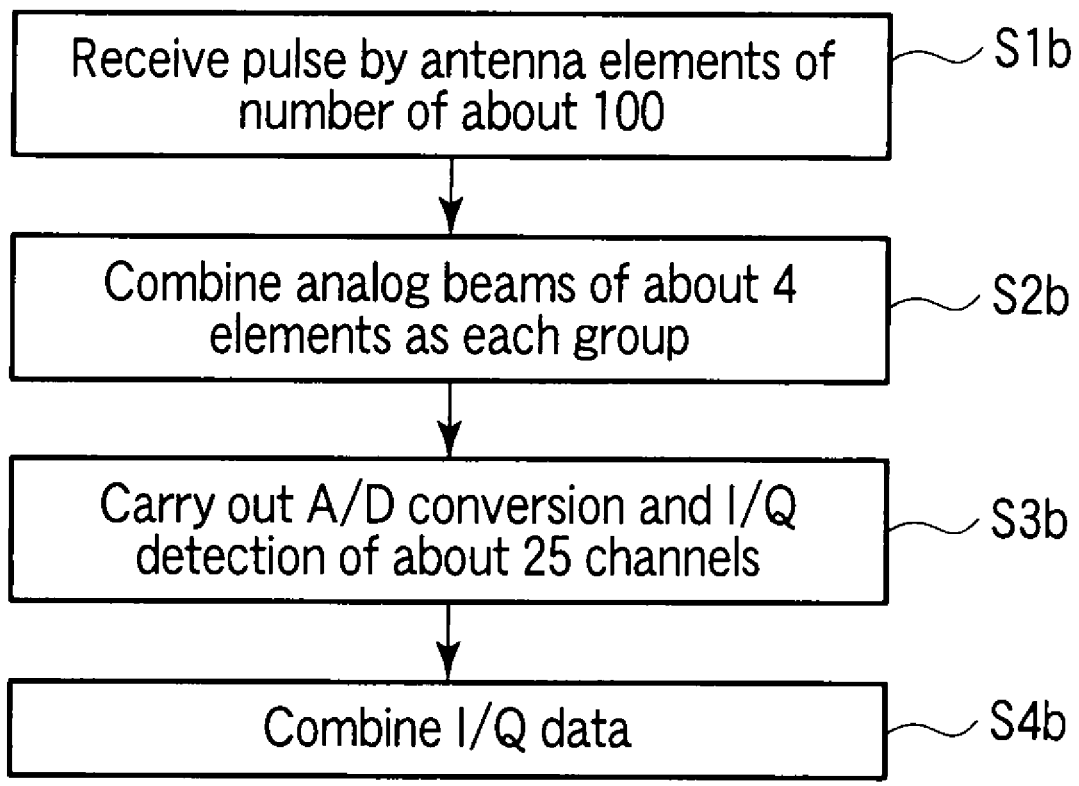
FIG. 8 is a flowchart showing a reception operation of a reflected pulse.

FIG. 8 is a flowchart showing a reception operation of a reflected pulse.

The antenna device 1 receives, at the antenna unit 11, a reflected pulse by means of antenna elements 11-1 of a number of about 100 (step S1b), and forms a reception wave by subjecting the reception system, in units of about four elements, to analog beam forming (subarraying) (step S2b). By the subarraying, it is possible to reduce the number of channels, simplify the configuration of the later stage, and shorten the processing time. The antenna device 1 subjects the combined wave of about 25 channels to A/D conversion, and then subjects the digital data to I/Q detection (Step S3b).

The I/Q data is supplied to the signal processing device 2, and is combined by the reception beam formation unit 21 by using DBF system (step S4b). The reception beam formation unit 21 simultaneously forms nine pencil-shaped antenna patterns with an elevation angle beamwidth of approximately 1° by DBF processing with respect to the transmission beams 701, 703, and 705 for each PRI as shown in FIG. 7. Thus, reception wave corresponding to an elevation angle of 9° can be processed for each PRI at a time.

The signal processing device 2 outputs data such as the received power, Doppler velocity, velocity width, and the like by normal weather radar signal processing on the basis of data obtained after the DBF processing. The data processing device 3 converts the data of the received power output from the signal processing device 2 into precipitation intensity (mm/h) on the basis of the radar equation. As for the Doppler velocity, aliasing correction or the like is carried out.

Therefore, according to the above embodiment, it is possible to realize a weather radar capable of collecting three-dimensional weather data at high resolution in terms of time and space. As a result, it becomes possible to carry out three-dimensional precipitation/wind velocity observation at spatial resolution of 100 meters cubed and time resolution of 10 second cycle in, for example, a space 30 km in every direction in the horizontal direction, and 14 km in the vertical direction.

Modification Example

Figure 9:
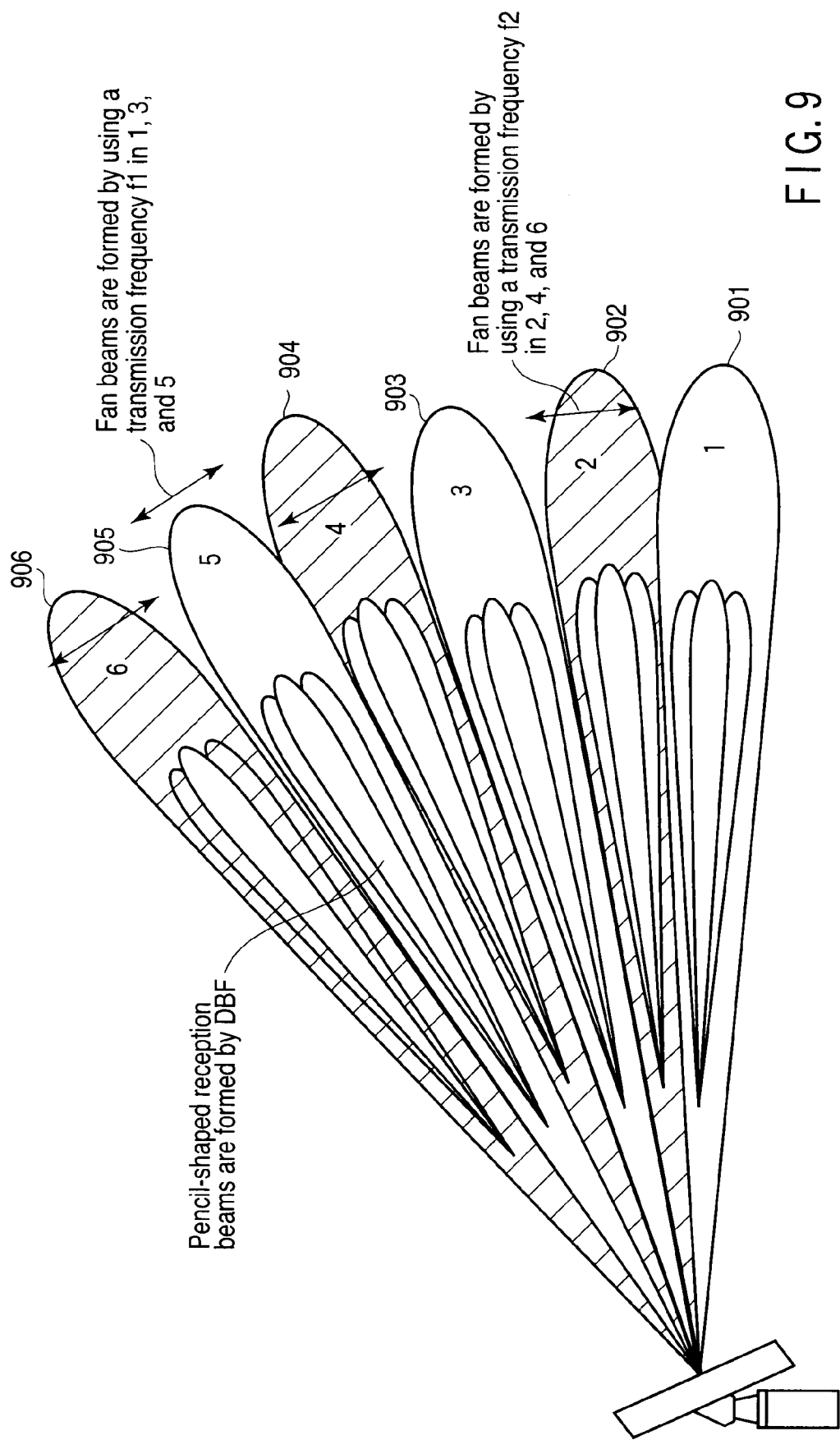
FIG. 9 is a schematic view showing another example of the transmission/reception beam.

FIG. 9 is a view schematically showing another example of the transmission/reception beam. Fan-shaped transmission beams 901 to 906 are formed simultaneously corresponding to the regions 1 to 6 with an elevation angle beamwidth of approximately 3°. The transmission beams 901, 903, and 905 are formed by using a transmission frequency f1. The transmission beams 902, 904, and 906 are formed by using a transmission frequency f2 in which is different from f1.

Figure 10:
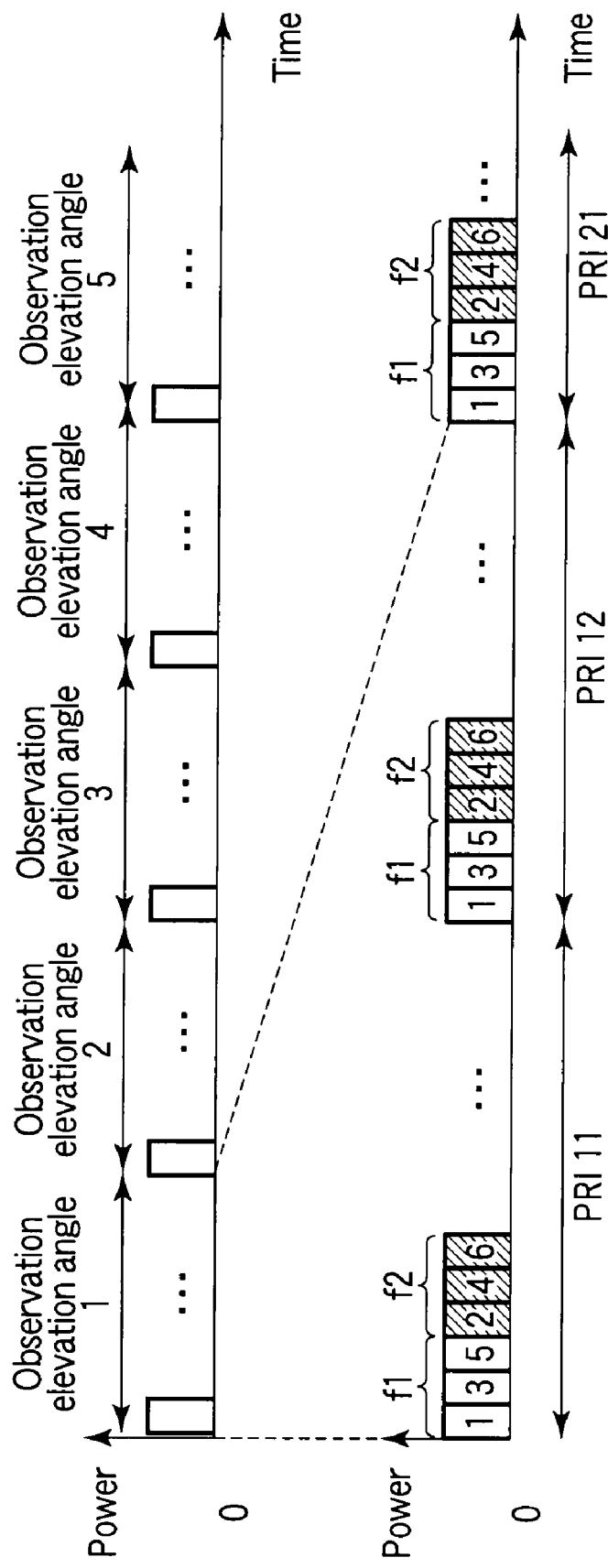
FIG. 10 is a view showing an observation sequence at the time of radar pulse transmission.

FIG. 10 is a view showing an observation sequence at the time of radar pulse transmission in this case. The transmission beam formation unit 12 divides the observation range in the elevation angle direction into a plurality of observation elevation angles, subdivides each observation elevation angle into a plurality of regions, assigns a different transmission frequency of radar pulses to each set of regions not adjacent to each other, and forms a plurality of fan-shaped transmission beams in the plurality of regions in the elevation angle direction at pulse repetition intervals. For example, a transmission frequency f1 is assigned to the set of regions 1, 3, and 5, and a transmission frequency f2 is assigned to the set of regions 2, 4, and 6. The transmission beam formation unit 12 forms simultaneously six transmission beams corresponding to the region 1 to 6 with an elevation angle beamwidth of approximately 3° in one PRI.

The reception beam formation unit 21 simultaneously forms 18 pencil-shaped antenna patterns with an elevation angle beamwidth of approximately 1° by DBF processing with respect to the transmission beams 901 to 906 for each PRI as shown in FIG. 9. Thus reception wave corresponding to an elevation angle of 18° can be processed for each PRI at a time.

In FIG. 7, transmission beams are formed with respect to the radar pulses of the same transmission frequency, and hence it is necessary, in order to prevent interference, to separate angles of transmission beams to be simultaneously formed from each other. As shown in FIGS. 9 and 10, by making the transmission frequencies of the radar pulses of the transmission beams adjacent to each other in the elevation angle direction in one PRI different from each other, it becomes possible to enhance the resolution of an elevation angle that can be observed in one PRI.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A weather radar comprising:
   an antenna unit of an active phased array system in which a plurality of antenna elements configured to transmit a radar pulse and receive a reflected pulse are arranged in a vertical direction;
   a transmission beam formation unit configured to divide an observation range in the elevation angle direction into a plurality of observation elevation angles, subdivide each observation elevation angle into a plurality of regions, assign a set of a plurality of regions not adjacent to each other to a pulse repetition interval (PRI), and form a fan-shaped transmission beam in the elevation angle direction for each of the regions in the set; and
   a reception beam formation unit configured to form a plurality pencil-shaped reception beams for each of the plurality of regions.

2. The weather radar according to claim 1, wherein at least one of the antenna elements is provided with a transmission module.

3. The weather radar according to claim 1, wherein the antenna element includes a slot antenna.

4. The weather radar according to claim 1, wherein the antenna elements are grouped into at least one subarray when receiving the reflected pulse.

5. The weather radar according to claim 1, wherein the reception beam formation unit employs a digital beam forming (DBF) system.

6. A weather radar comprising:

an antenna unit of an active phased array system in which a plurality of antenna elements configured to transmit a radar pulse and receive a reflected pulse are arranged in a vertical direction;

a transmission beam formation unit configured to divide an observation range in the elevation angle direction into a plurality of observation elevation angles, subdivide each observation elevation angle into a plurality of regions, assign each of transmission frequencies of radar pulses different from each other to each set of regions not adjacent to each other, and form a plurality of fan-shaped transmission beams in the plurality of regions in the elevation angle direction at pulse repetition intervals (PRIs); and a reception beam formation unit configured to form a plurality pencil-shaped reception beams for each of the plurality of regions.

7. The weather radar according to claim 6, wherein at least one of the antenna elements is provided with a transmission module.

8. The weather radar according to claim 6, wherein the antenna element includes a slot antenna.

9. The weather radar according to claim 6, wherein the antenna elements are grouped into at least one sub-array when receiving the reflected pulse.

10. The weather radar according to claim 6, wherein the reception beam formation unit employs a digital beam forming (DBF) system.

11. A weather observation method used for a weather radar including an antenna unit of an active phased array system in which a plurality of antenna elements configured to transmit a radar pulse and receive a reflected pulse are arranged in a vertical direction comprising:

dividing an observation range in the elevation angle direction into a plurality of observation elevation angles;

subdividing each observation elevation angle into a plurality of regions;

assigning a set of a plurality of regions not adjacent to each other to a pulse repetition interval (PRI);

forming a fan-shaped transmission beam in the elevation angle direction for each of the regions in the set; and forming a plurality of pencil-shaped reception beams for each of the plurality of regions.

12. A weather observation method used for a weather radar including an antenna unit of an active phased array system in which a plurality of antenna elements configured to transmit a radar pulse and receive a reflected pulse are arranged in a vertical direction comprising:

dividing an observation range in the elevation angle direction into a plurality of observation elevation angles;

subdividing each observation elevation angle into a plurality of regions;

assigning each of transmission frequencies of radar pulses different from each other to each set of regions not adjacent to each other;

forming a plurality of fan-shaped transmission beams in the plurality of regions in the elevation angle direction at pulse repetition intervals (PRIs); and forming a plurality pencil-shaped reception beams for each of the plurality of regions.

\* \* \* \* \*